United States Patent
Urashima et al.

(10) Patent No.: US 12,466,343 B2
(45) Date of Patent: Nov. 11, 2025

(54) ELECTRIC WIRE FIXING DEVICE AND WIRE HARNESS

(71) Applicant: YAZAKI CORPORATION, Tokyo (JP)

(72) Inventors: Tomohiro Urashima, Nasukarasuyama (JP); Hiroyasu Furuya, Nasukarasuyama (JP); Yu Sugawara, Nasukarasuyama (JP)

(73) Assignee: YAZAKI CORPORATION, Tokyo (JP)

( * ) Notice: Subject to any disclaimer, the term of this patent is extended or adjusted under 35 U.S.C. 154(b) by 192 days.

(21) Appl. No.: 18/424,917

(22) Filed: Jan. 29, 2024

(65) Prior Publication Data

US 2024/0253584 A1      Aug. 1, 2024

(30) Foreign Application Priority Data

Jan. 30, 2023   (JP) .................. 2023-011507

(51) Int. Cl.
*B60R 16/02*   (2006.01)
(52) U.S. Cl.
CPC ................. *B60R 16/0215* (2013.01)
(58) Field of Classification Search
CPC ................................. B60R 16/0215
USPC ........................................... 174/68.1
See application file for complete search history.

(56) References Cited

U.S. PATENT DOCUMENTS

| | | |
|---|---|---|
| 2015/0222102 A1 | 8/2015 | Sugimoto |
| 2015/0230812 A1 | 8/2015 | Ametani et al. |
| 2020/0217353 A1 | 7/2020 | Imagawa et al. |

FOREIGN PATENT DOCUMENTS

| | | |
|---|---|---|
| JP | S64-57413 U | 4/1989 |
| JP | 2014-76227 A | 5/2014 |
| JP | 2014-82850 A | 5/2014 |
| JP | 2019-70437 A | 5/2019 |

*Primary Examiner* — Timothy J Thompson
*Assistant Examiner* — Michael F Mcallister
(74) *Attorney, Agent, or Firm* — KENEALY VAIDYA LLP

(57) ABSTRACT

An electric wire fixing device includes: a protector attached to the outer periphery of a bending tube and a straight tube that house an electric wire; and a clamp configured to be fixed to a vehicle, the clamp being attached to the protector in a manner of being allowed to make a sliding movement in an extending direction of the electric wire and make a rotational movement about the extending direction. The protector includes a movement restriction part that restricts a moving area of the sliding movement of the clamp.

5 Claims, 10 Drawing Sheets

FIG.7
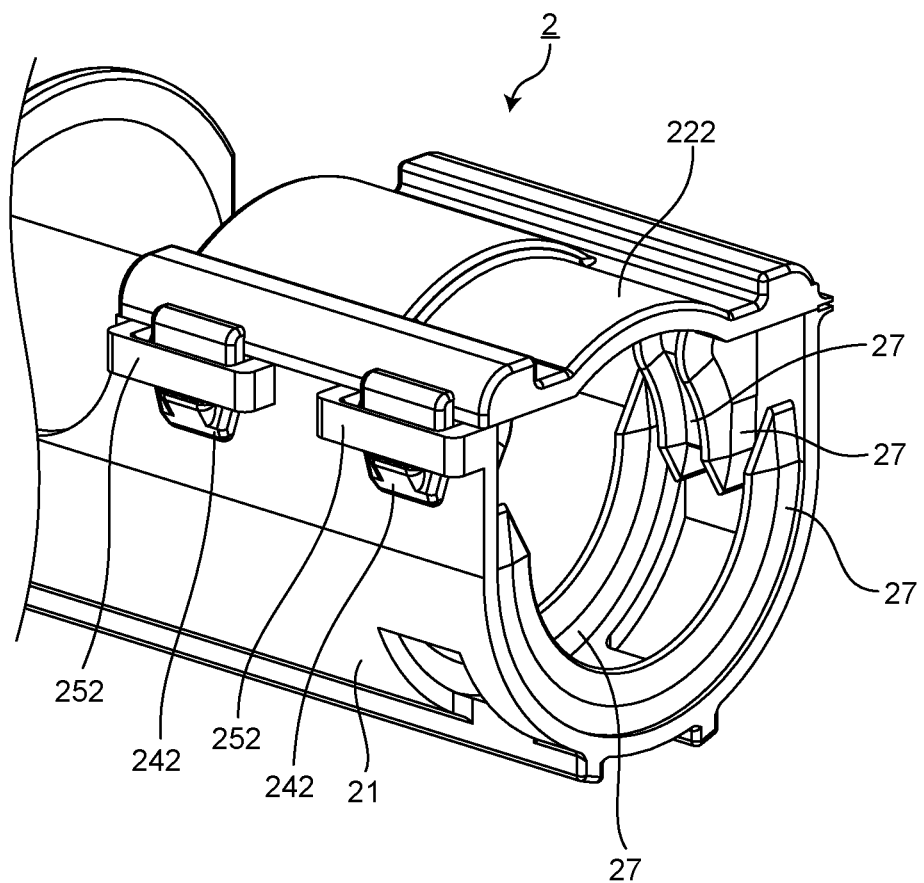
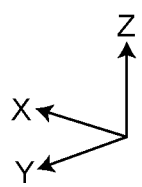

ELECTRIC WIRE FIXING DEVICE AND WIRE HARNESS

CROSS-REFERENCE TO RELATED APPLICATION(S)

The present application claims priority to and incorporates by reference the entire contents of Japanese Patent Application No. 2023-011507 filed in Japan on Jan. 30, 2023.

BACKGROUND OF THE INVENTION

1. Field of the Invention

The present invention relates to an electric wire fixing device and a wire harness.

2. Description of the Related Art

Conventionally, in regards to an electric wire fixing device and a wire harness, as described in Japanese Patent Application Laid-open No. 2014-082850, for example, there is an electric wire exterior protection tube that covers an outer periphery of an electric wire, allows a fixing member to be attached, and fixes the electric wire via the fixing member. This exterior protection tube is designed to simplify or smoothen routing work by absorbing dimensional tolerances and fixing the fixing member at a prescribed position through allowing the fixing member to make a sliding movement against the exterior protection tube.

However, the above-mentioned exterior protection tube may be difficult to do the routing work in some cases. For example, even when the fixing member can be disposed at a prescribed position by performing a sliding movement of the fixing member with respect to the exterior protection tube, the posture or the angle of the fixing member may not match the fixing face, so that the fixing work of the fixing member may not be performed smoothly and the wire routing work may not be performed smoothly.

SUMMARY OF THE INVENTION

It is therefore an object of the present invention to provide an electric wire fixing device and a wire harnesses enabling smooth wire routing work.

In order to achieve the above mentioned object, an electric wire fixing device according to one aspect of the present invention includes an electric wire protection member attached to an outer periphery of a cylindrical member configured to house an electric wire; and a fixing member configured to be fixed to a vehicle, the fixing member being attached to the electric wire protection member in a manner of being allowed to make a sliding movement in an extending direction of the electric wire and make a rotational movement about the extending direction, wherein the electric wire protection member includes a movement restriction part configured to restrict a moving area of the sliding movement of the fixing member.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an explanatory diagram of a biting part of the electric wire fixing device according to the first embodiment;

DETAILED DESCRIPTION OF THE PREFERRED EMBODIMENTS

Hereinafter, embodiments according to the present invention will be described in detail with reference to the accompanying drawings. It is to be noted that the present invention is not limited by the embodiments. Furthermore, the structural components in the following embodiments include those that are easily replaceable by those skilled in the art, or those that are substantially the same.

Embodiments

Figure 1:
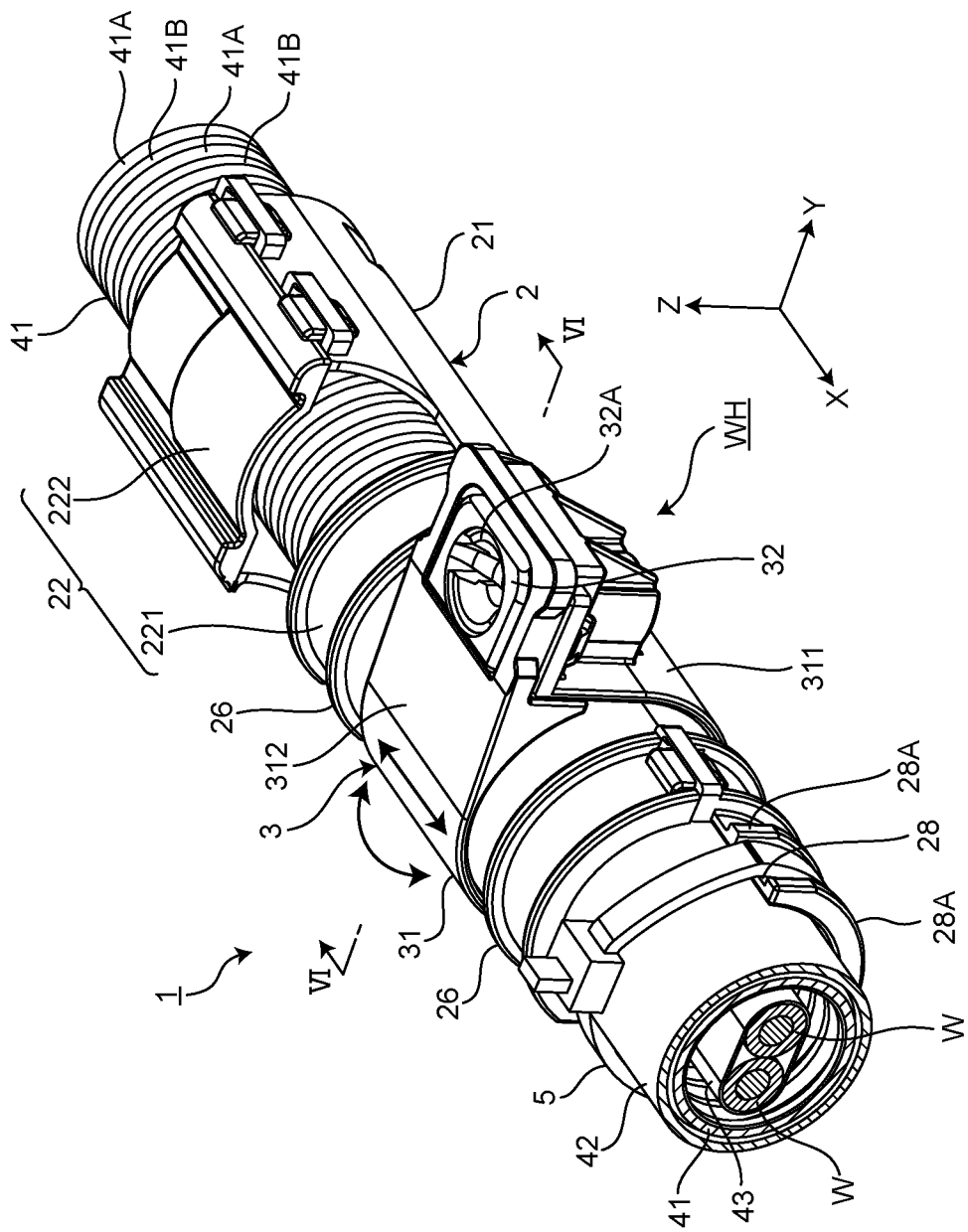
FIG. 1 is a perspective view illustrating an electric wire fixing device and a wire harness according to a first embodiment.
Figure 2:
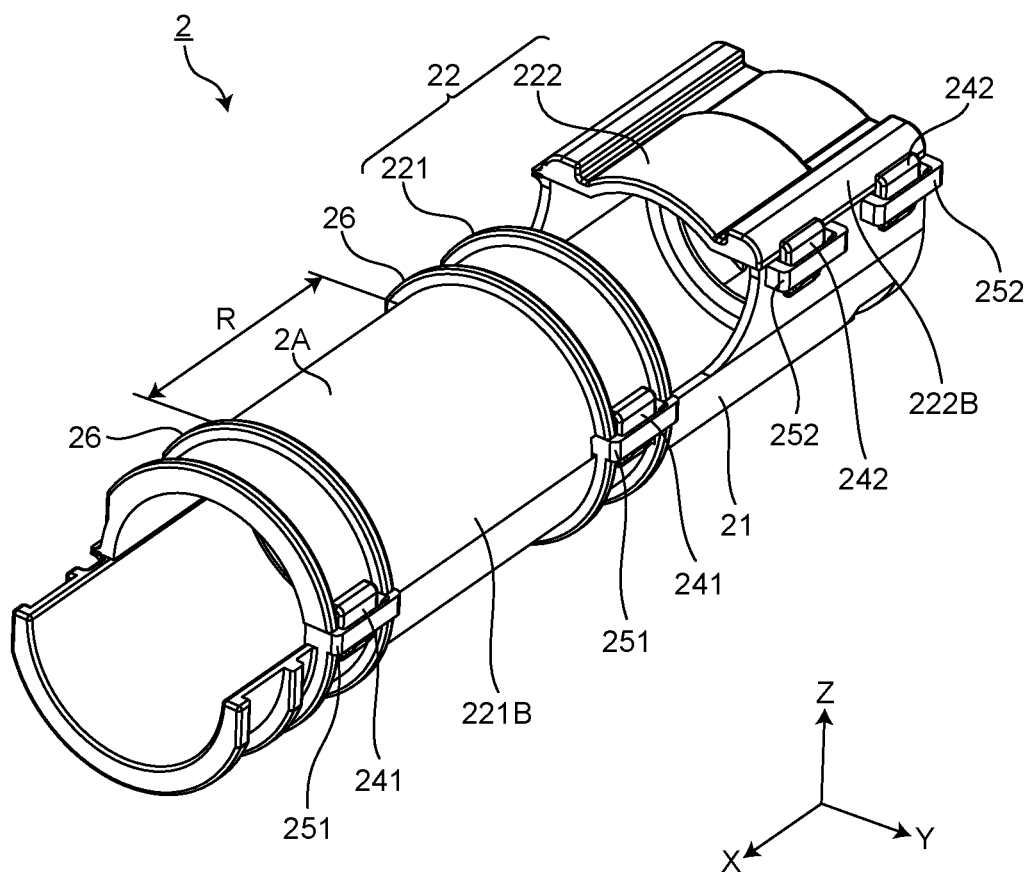
FIG. 2 is a perspective view illustrating a protector of the electric wire fixing device according to the first embodiment.
Figure 3:
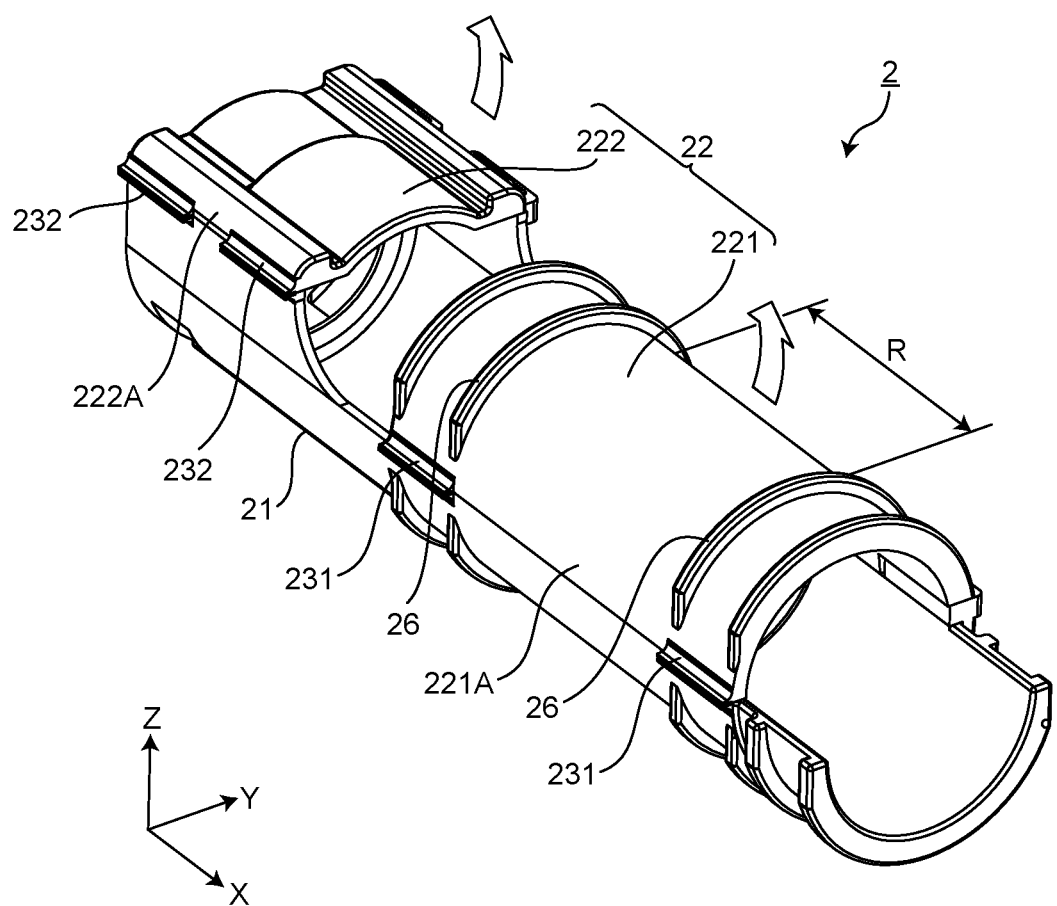
FIG. 3 is a perspective view illustrating the protector of the electric wire fixing device according to the first embodiment.
Figure 4:
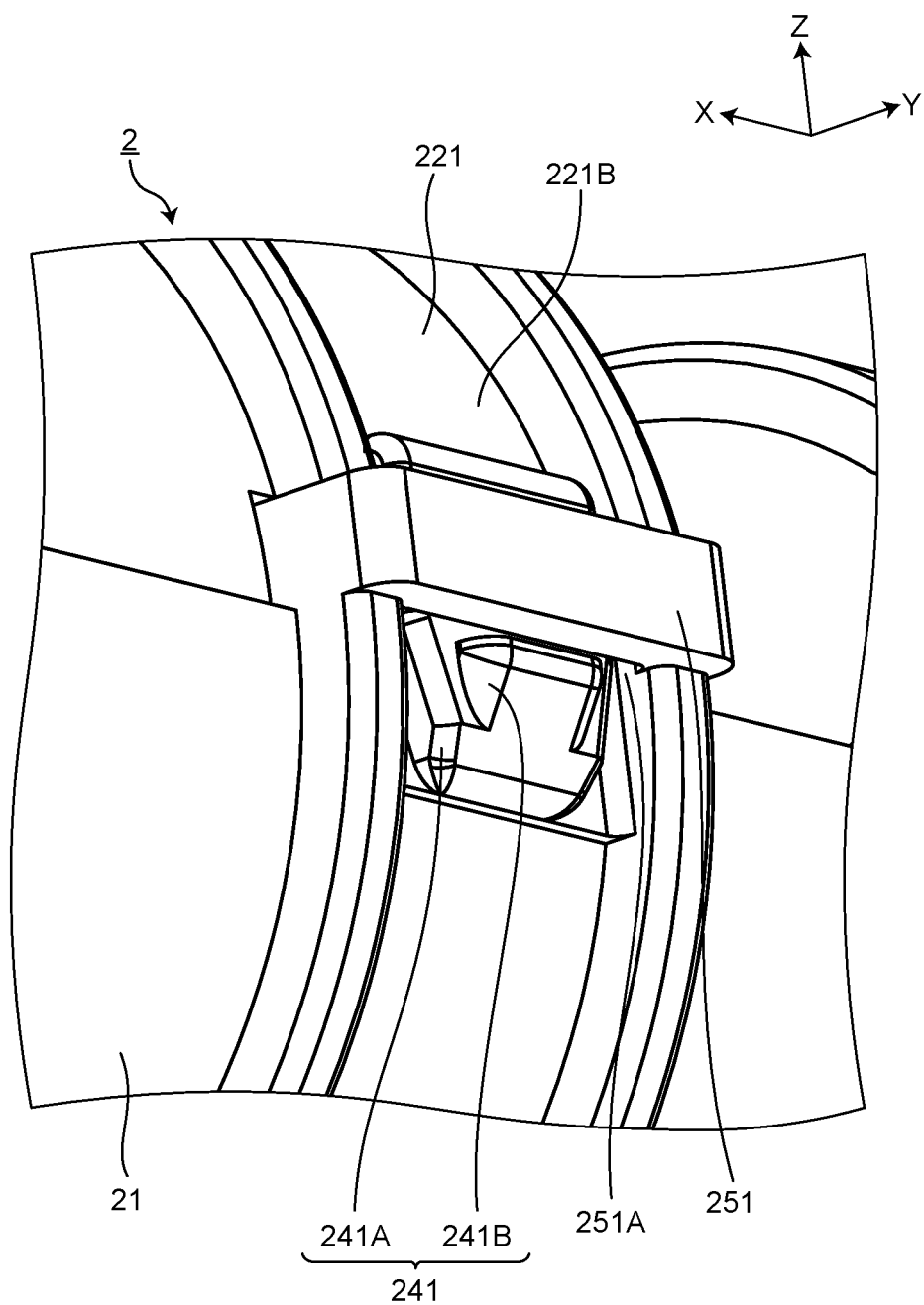
FIG. 4 is an explanatory diagram of a lock mechanism in a lid part of the electric wire fixing device according to the first embodiment.
Figure 5:
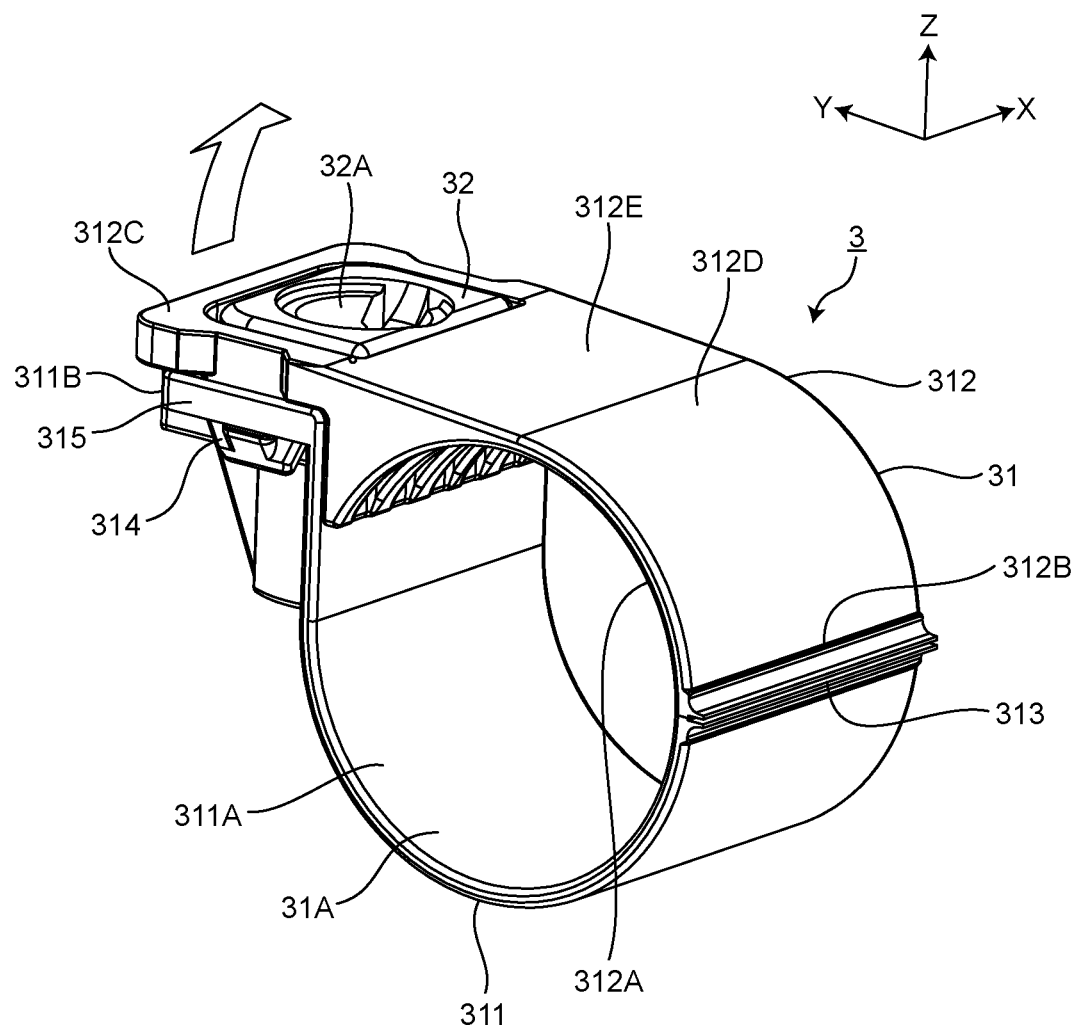
FIG. 5 is a perspective view illustrating a clamp of the electric wire fixing device according to the first embodiment.
Figure 6:
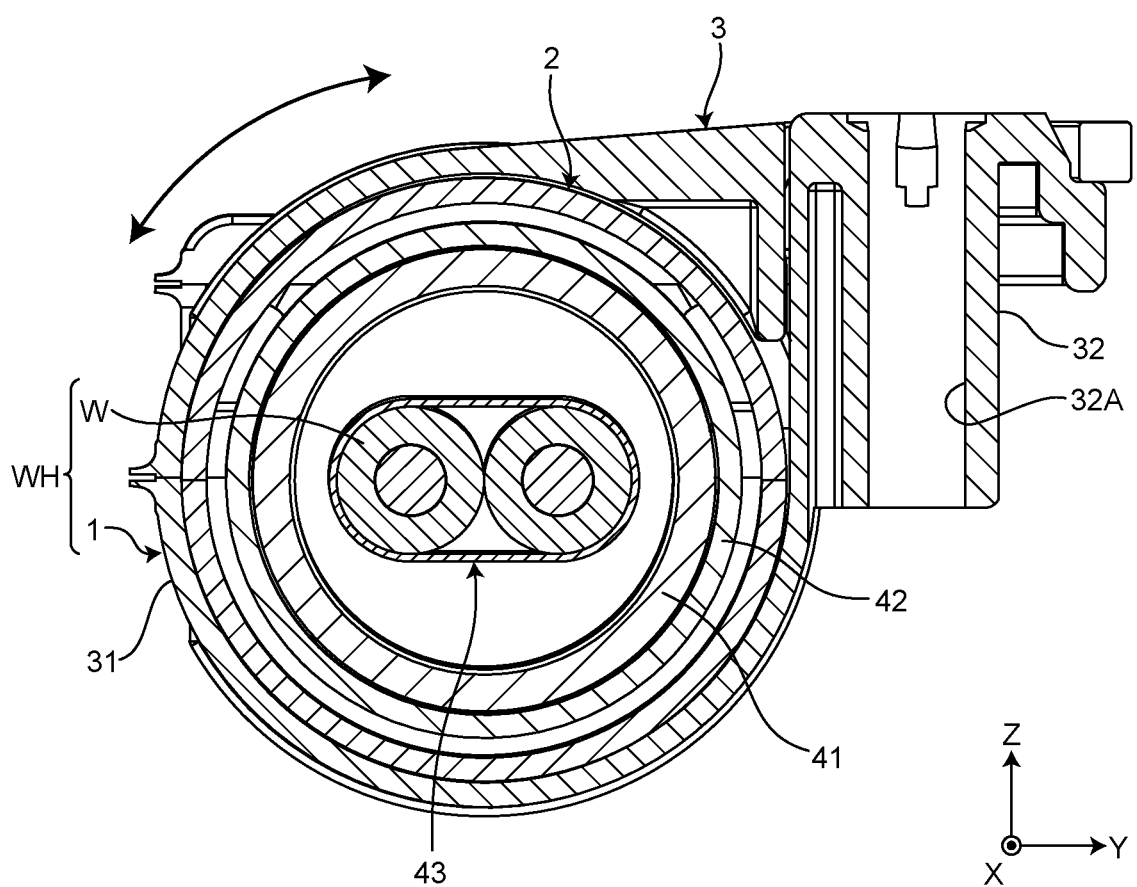
FIG. 6 is a sectional view of the electric wire fixing device and the wire harness taken along line VI-VI in FIG. 1.
Figure 8:
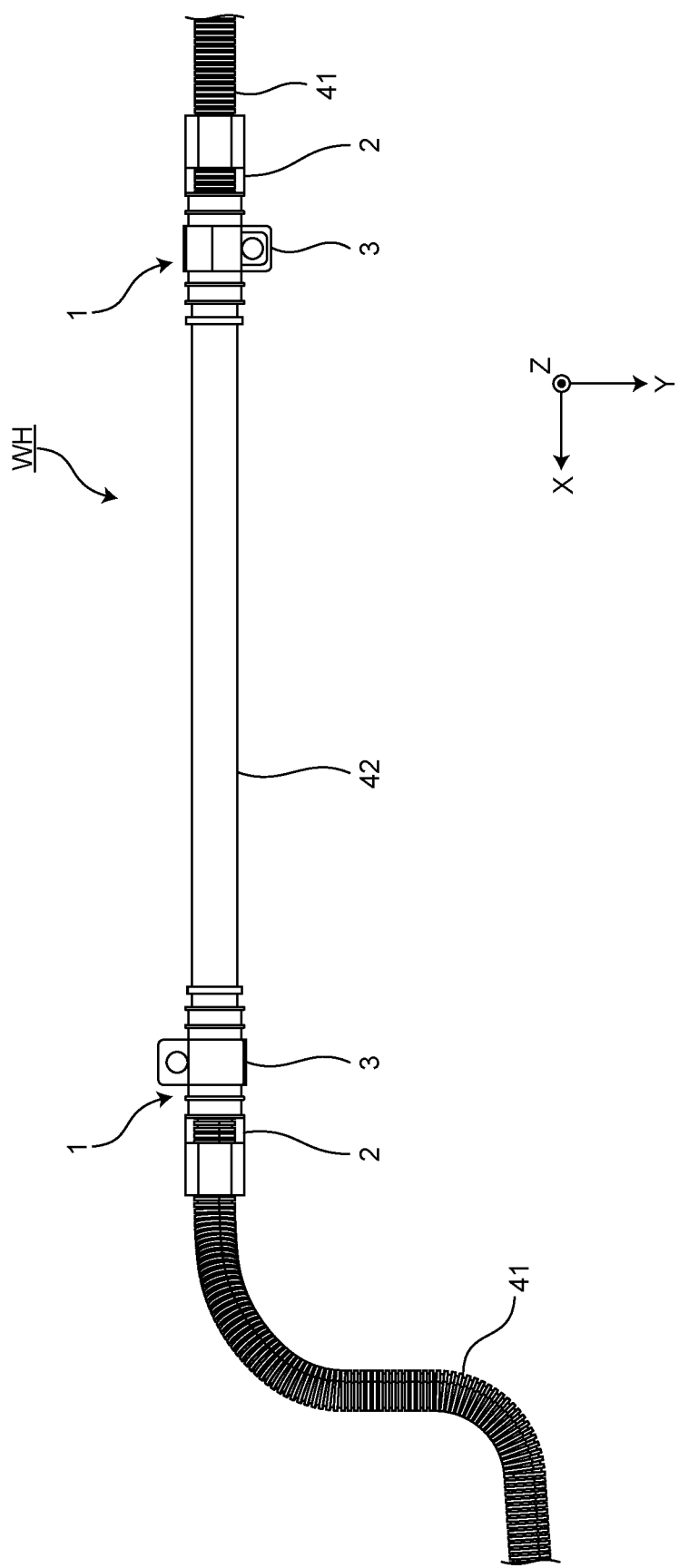
FIG. 8 is an explanatory diagram of an electric wire fixing method used in the electric wire fixing device and the wire harness according to the first embodiment.
Figure 9:
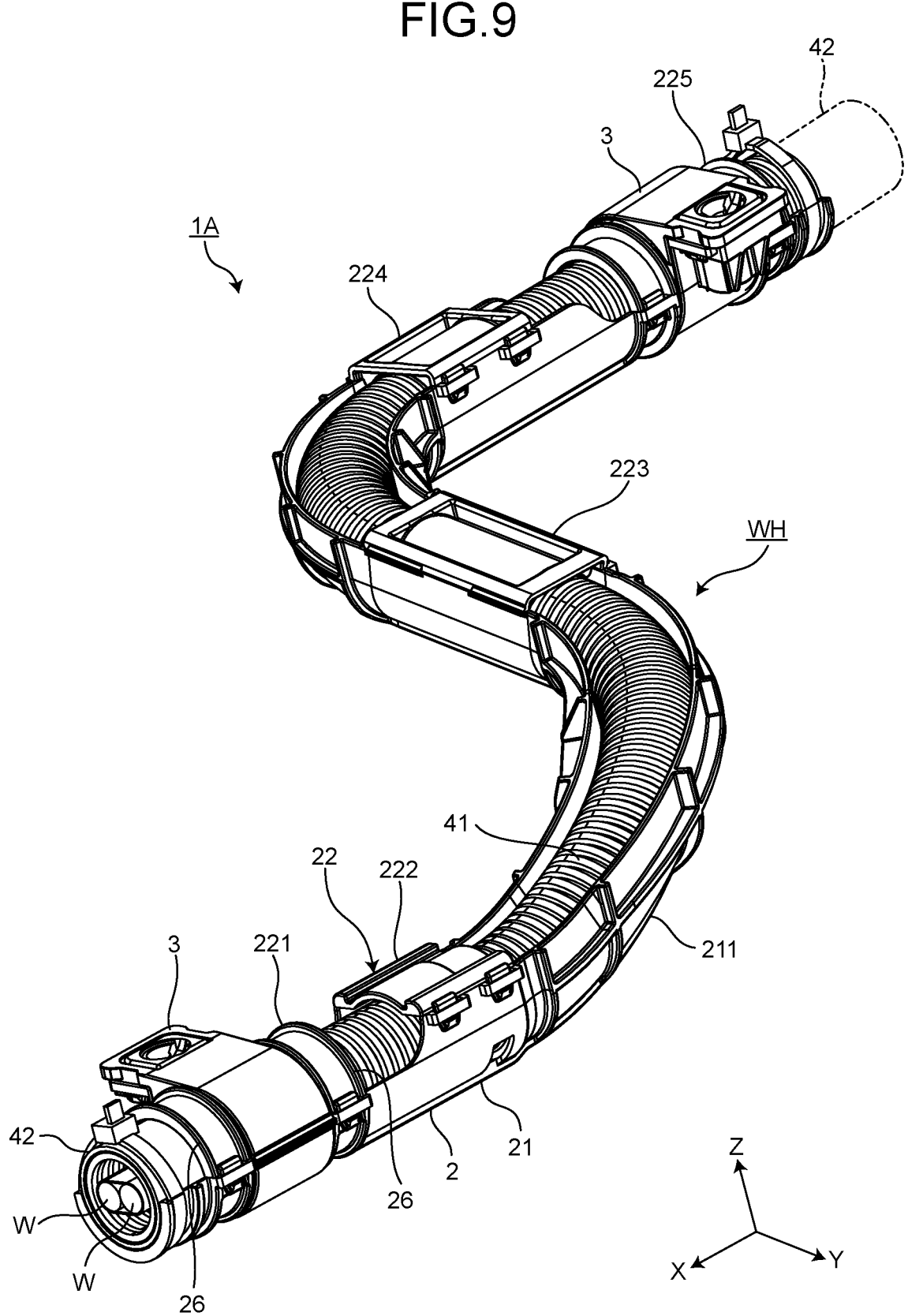
FIG. 9 is a perspective view illustrating an electric wire fixing device and a wire harness according to a second embodiment.
Figure 10:
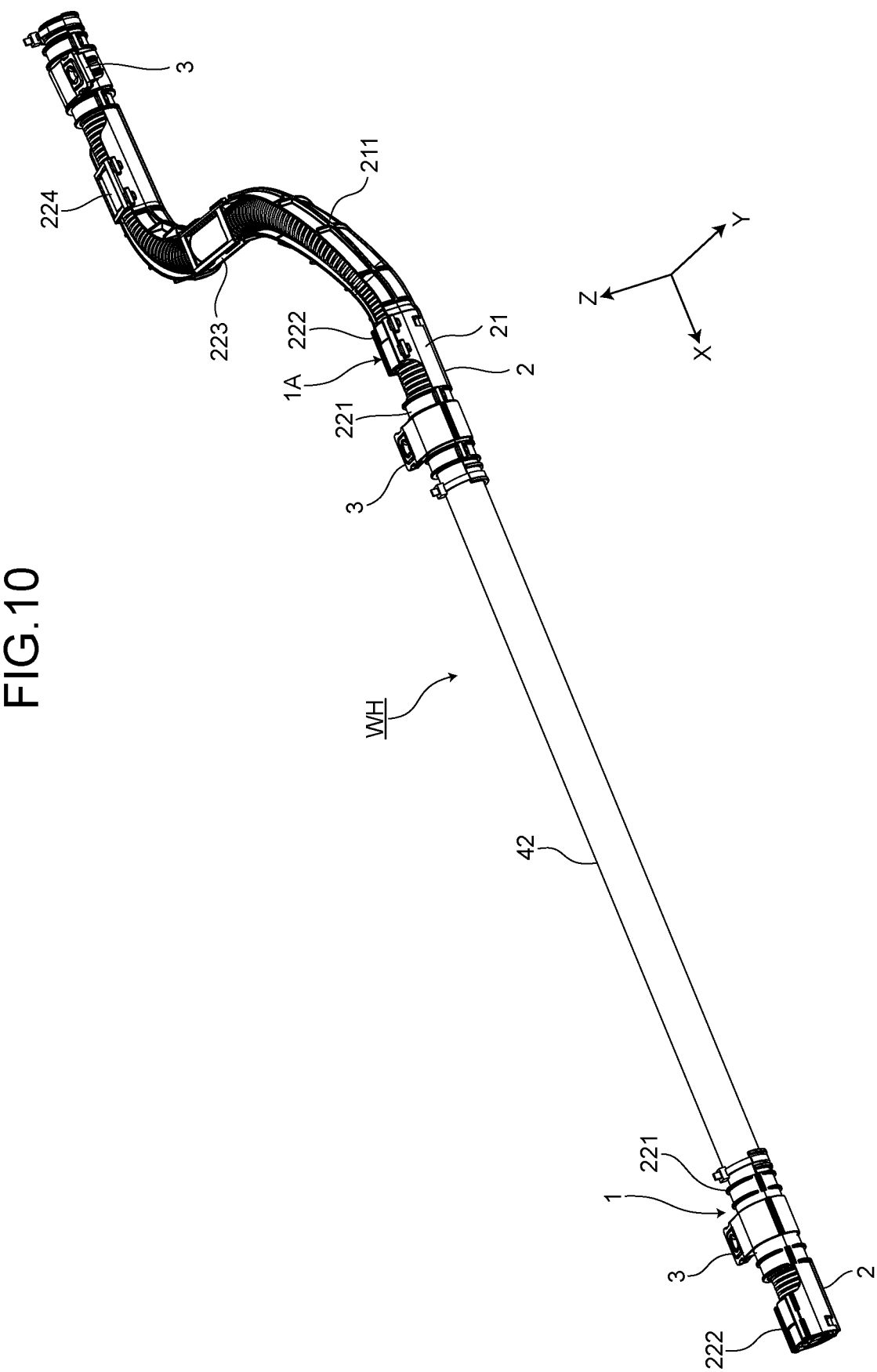
FIG. 10 is an explanatory diagram of a modification example of the electric wire fixing device and the wire harness according to the embodiments.

The present embodiments relate to an electric wire fixing device and a wire harness. FIG. 1 is a perspective view illustrating an electric wire fixing device according to a first embodiment. FIG. 2 is a perspective view illustrating a protector of the electric wire fixing device according to the first embodiment. FIG. 3 is a perspective view illustrating the protector of the electric wire fixing device according to the first embodiment. FIG. 4 is an explanatory diagram of a lock mechanism in a lid part of the electric wire fixing device according to the first embodiment. FIG. 5 is a perspective view illustrating a clamp of the electric wire fixing device according to the first embodiment. FIG. 6 is a sectional view of the electric wire fixing device and the wire harness taken along line VI-VI in FIG. 1. FIG. 7 is an explanatory diagram of a biting part of the electric wire fixing device according to the first embodiment. FIG. 8 is an explanatory diagram of an electric wire fixing method used in the electric wire fixing device and the wire harness according to the first embodiment. FIG. 9 is a perspective view illustrating an electric wire fixing device and a wire harness according to a second embodiment. FIG. 10 is an explanatory diagram of a modification example of the electric wire fixing device and the wire harness according to the embodiments.

In the following description, in regards to a first direction, a second direction, and a third direction intersecting with each other, the first direction is referred to as an "axial direction X", the second direction as a "width direction Y", and the third direction as a "height direction Z". Herein, the axial direction X, the width direction Y, and the height direction Z are orthogonal to each other. The axial direction X corresponds to the axial direction of electric wires or the extending direction of the electric wires. The width direction Y and the height direction Z correspond to intersecting directions that intersect with the axial direction X. Furthermore, unless otherwise noted, each of the directions used in the following description represents the direction in a state where components are mounted to each other. Note that orthogonal herein includes almost orthogonal.

The electric wire fixing device and the wire harnesses according to the first embodiment will be described.

As illustrated in FIG. 1, an electric wire fixing device 1 according to the first embodiment is a device configured to fix electric wires W to a vehicle, the electric wires W being routed in a vehicle, and is installed in the vehicle for use. The electric wires W configure a wire harness WH that connects between electrical devices installed in the vehicle. The electrical devices include electronic control devices, sensors, circuit devices, motors, batteries, and the like. The wire harness WH includes the electric wires W and the electric wire fixing device 1.

The electric wire fixing device 1 includes a protector 2 and a clamp 3. The protector 2 is an electric wire protection member configured to cover the outer periphery of the electric wires W, and is attached to the electric wires W via a cylindrical member or a tubular member configured to house the electric wires W. The clamp 3 is a fixing member configured to be fixed to the vehicle, and fixes the electric wires W to the vehicle via the protector 2. The clamp 3 has an annular part 31 and a fixing part 32. The annular part 31 is a part configured to be attached to the protector 2, and is formed in a cylindrical shape, for example, and attached to the outer periphery of an outer peripheral face 2A of the protector 2. The fixing part 32 is a part configured to be fixed to a vehicle, and is formed integrally with the annular part 31 and has a hole 32A formed therein for fixing. For example, the fixing part 32 fixes the clamp 3 to a vehicle by inserting a fixed member such as a stud bolt protruding from the body or the like of the vehicle into the hole 32A. By fixing the fixing part 32 to the vehicle, the protector 2 and the electric wires W are fixed to the vehicle. In regards to the clamp 3, the fixing structure for the vehicle may also be a configuration other than the fixing part 32 described above, as long as it enables fixing to the vehicle.

The electric wires W are inserted into the inner side of a bending tube 41 and a straight tube 42, and the protector 2 is attached to the outer peripheral part of the bending tube 41 and the straight tube 42. There are two electric wires W provided, for example, and each of those is housed inside the bending tube 41 and the straight tube 42. The two electric wires W are bound together by a binding member 43 such as tape, and a connector or the like is attached to each end, thereby functioning as a wire harness. Note that there may be one, or three or more electric wires W provided inside the bending tube 41 and the straight tube 42.

The bending tube 41 is a bendable tubular body, and a bellows-shaped corrugated tube is used, for example. The bending tube 41 has a convex part 41A and a concave part 41B repeatedly formed along the axial direction X in the outer periphery. As the straight tube 42, a rigid tube is used, for example, which is formed as a tubular body extending straight and configured to be more rigid and less likely to be bent compared to the bending tube 41. For example, the straight tube 42 is provided on the outer periphery side of the bending tube 41 to be coaxial with the bending tube 41. In this case, the bending tube 41 may be provided only at the end part of the straight tube 42 or may be provided over the entire installed area of the straight tube 42. The electric wires W are routed in a straight line form in the area where the straight tube 42 is provided, and routed by being bent or curved in the area where only the bending tube 41 is provided. In the electric wire fixing device 1, for example, the bending tube 41 and the straight tube 42 are disposed alternately toward the extending direction. In other words, the bending tube 41 and the straight tube 42 are alternately disposed in the outer periphery of the cylindrical member to which the protector 2 is attached. The protector 2 covers the outer periphery of the bending tube 41 and the straight tube 42 by being attached at the boundary position between the bending tube 41 and the straight tube 42, and holds the straight tube 42 inserted into the inner side of the mounting position of the clamp 3.

As illustrated in FIG. 2 and FIG. 3, the protector 2 is formed in a cylindrical shape and has a main body part 21 and a lid part 22. The main body part 21 and the lid part 22 are formed by dividing the protector 2 in the circumferential direction. Therefore, the main body part 21 and the lid part 22 are members having an arc-shaped cross section, forming arc shapes in the cross section taken along the direction that intersects with the extending direction of the electric wires W. The arc shape here includes almost arc shape. The outer periphery of the bending tube 41 and the straight tube 42 is covered partially by each of the main body part 21 and the lid part 22, for example, and the entire outer periphery of the bending tube 41 and the straight tube 42 is covered by both of the main body part 21 and the lid part 22.

The lid part 22 is provided to be openable and closeable with respect to the main body part 21. The lid part 22 has its one end part axially supported by the main body part 21 and rotates about the other end part to be openable and closeable with respect to the main body part 21. As for the electric wire fixing device 1, the protector 2 can be attached to the outer periphery of the bending tube 41 and the straight tube 42 by opening the lid part 22. The lid part 22 has a first lid 221 and a second lid 222, for example. The first lid 221 and the second lid 222 are provided at different positions in the axial direction X. For example, the first lid 221 is disposed at the position where the straight tube 42 is provided, and the second lid 222 is disposed at the position where the bending tube 41 is provided.

In FIG. 3, one end part 221A of the first lid 221 in the width direction Y is axially supported to the main body part 21 by first hinges 231. Thus, the first lid 221 rotates about the first hinges 231, and opens and closes with respect to the main body part 21. In FIG. 2, first locking parts 241 are formed at the other end part 221B of the first lid 221 in the width direction Y. The first locking parts 241 can be engaged with first locked parts 251 formed in the main body part 21, configuring a lock mechanism of the first lid 221.

For example, as illustrated in FIG. 4, the first locking part 241 has a locking arm 241A extending out from the end part 221B in the circumferential direction, and a protrusion 241B is formed at the tip of the locking arm 241A. The first locked part 251 has, for example, a locking hole 251A through which the locking arm 241A can be inserted, and the locking arm 241A is inserted into the locking hole 251A. In the first locking part 241, the protrusion 241B restricts the locking arm 241A from slipping out from the locking hole 251A to lock the first lid 221 to prevent it from opening.

In FIG. 2 and FIG. 3, one end part 222A of the second lid 222 in the width direction Y is axially supported to the main body part 21 by second hinges 232. Thus, the second lid 222 rotates about the second hinges 232, and opens and closes with respect to the main body part 21. Second locking part 242 are formed at the other end part 222B of the second lid 222 in the width direction Y. The second locking parts 242 can be engaged with second locked parts 252 formed in the main body part 21, configuring a lock mechanism of the second lid 222. The second locking part 242 and the second locked part 252 are in a similar structure to that of the first locking parts 241 and the first locked parts 251 described above, and lock the second lid 222 to prevent it from opening.

As illustrated in FIG. 5, the annular part 31 of the clamp 3 has a main body part 311 and a lid part 312. The main body part 311 forms an arc-shaped inner peripheral face 311A, and the lid part 312 forms an arc-shaped inner peripheral face 312A. The inner peripheral face 311A and the inner peripheral face 312A form a circular inner peripheral face 31A. The lid part 312 rotates about a hinge 313, and is openable and closeable with respect to the main body part 311. That is, one end part 312B of the lid part 312 in the width direction Y is axially supported to the main body part 311 by the hinge 313. Thus, the lid part 312 rotates about the hinge 313, and opens and closes against the main body part 311. A locking part 314 is formed at the other end part 312C of the lid part 312 in the width direction Y. The locking part 314 can be engaged with a locked part 315 formed in the main body part 311, configuring a lock mechanism of the lid part 312.

The fixing part 32 described above is formed at an end part 311B where the locked part 315 is formed in the main body part 311. An outer peripheral face 312D of the lid part 312 forms a plane part 312E that extends toward the tangential direction along the width direction Y. The plane part 312E is a part that forms a flat surface. In the plane part 312E, the hole 32A of the fixing part 32 is opened. This makes it possible to attach the electric wire fixing device 1 by tightly fitting the plane part 312E of the lid part 312 to the mounting part of the vehicle, so that the electric wire fixing device 1 can be attached to the vehicle appropriately.

In FIG. 2 and FIG. 3, movement restriction parts 26 are formed in the protector 2. The movement restriction part 26 is a part configured to restrict the sliding movement of the clamp 3, and is formed on the outer periphery part of the main body part 21 and the first lid 221. The movement restriction part 26 is a protrusion body protruding from the outer peripheral face 2A of the protector 2, and two of which are formed while being spaced apart in the axial direction X. For example, the movement restriction part 26 is formed in an annular shape by protruding from the outer peripheral face 2A and extending in the circumferential direction. The outer peripheral face 2A between the two movement restriction parts 26, 26 is the mounting position of the clamp 3, and is a moving area R of the sliding movement of the clamp 3. The clamp 3 is attached by covering the outer periphery of the outer peripheral face 2A between the two movement restriction parts 26, 26 with the annular part 31.

The length of the moving area R between the movement restriction part 26 and the movement restriction part 26 is set to be longer than the dimension of the width of the annular part 31 of the clamp 3 in the axial direction X. Thus, the clamp 3 can make a sliding movement between the two movement restriction parts 26 along the axial direction X. The length of the moving area R of the clamp 3 is set in accordance with, for example, the dimensional error of the bending tube 41 and the straight tube 42, the routing error of the electric wires W, and the like. The outer diameter of the outer peripheral face 2A between the movement restriction part 26 and the movement restriction part 26 is formed to be shorter than the inner diameter of the annular part 31 of the clamp 3. This allows the clamp 3 to make a rotational movement while being attached to protector 2, as illustrated in FIG. 6.

In FIG. 3, the first hinges 231 and 231 allowing the first lid 221 to rotate are provided outside the moving area R of the clamp 3. For example, the first hinges 231 are provided outside the area of the outer peripheral face 2A between the movement restriction parts 26, 26 in the axial direction X. By forming the first hinges 231 in this manner, the outer peripheral face 2A where the clamp 3 is disposed can be formed as a smooth circumferential face, thereby making it possible to smoothen the rotational movement of the clamp 3.

The protector 2 and the clamp 3 are formed by injection molding, for example. This allows the protector 2 and the clamp 3 to be formed with high precision. Thereby, the protector 2 can be stably attached to the bending tube 41 and the straight tube 42, which improves the workability of attaching the protector 2. In addition, the sliding movement and rotational movement of the clamp 3 against the protector 2 can be performed stably.

In FIG. 2 and FIG. 5, a surface treatment to increase the surface roughness may be performed on the outer peripheral face 2A between the movement restriction part 26 and the movement restriction part 26 and on the inner peripheral face 31A of the annular part 31 of the clamp. For example, surface texturing may be performed on the outer peripheral face 2A and the inner peripheral face 31A. In this case, the clamp 3 is allowed to make a sliding movement and a rotational movement with respect to the protector 2, but excessive sliding is suppressed. This makes it easier to maintain the position and posture of the clamp 3 in the electric wire fixing device 1, so that fixing work of the electric wires W can be performed smoothly.

As illustrated in FIG. 7, biting parts 27 are formed in the protector 2. The biting part 27 is a part that holds the protector 2 to the bending tube 41 by biting into a concave part of the outer periphery of the bending tube 41. The biting part 27 is a protrusion body protruding from the inner periphery of the main body part 21, and is formed in an arc shape by extending the circumferential direction. As for the biting part 27, there are a plurality of those formed by being spaced apart along the axial direction X, for example. In a state where the protector 2 is being attached to the outer periphery of the bending tube 41, the biting part 27 enters into the concave part 41B of the bending tube 41 and restricts the movement of the protector 2 in the axial direction X with respect to the bending tube 41.

In FIG. 1, a binding part 28 is formed in the protector 2. The binding part 28 is a part for attaching a binding member 5 that binds the protector 2 and the straight tube 42. The binding member 5 is a band-like body or a string-like body that can bind the protector 2 and the straight tube 42, and a cable tie or the like is used, for example. The binding part 28 is formed by extending, in the axial direction X, the main body part 21 to which the first lid 221 is attached, for example, and it has protrusions 28A, 28A that restrict the movement of the binding member 5 in the axial direction X.

In the main body part 21 where the binding part 28 is formed, the lid part 22 is not provided. Therefore, by attaching the binding member 5 to the binding part 28 while the protector 2 is being attached to the straight tube 42, the straight tube 42 and the protector 2 are bound, and the protector 2 is supported to the straight tube 42.

Next, an electric wire fixing method used in the electric wire fixing device 1 and the wire harness WH according to the present embodiment will be described.

In FIG. 1, when fixing the electric wires W using the electric wire fixing device 1 and the wire harness WH, first, the bending tube 41 and the straight tube 42 are externally mounted to the electric wires W. In other words, the bending tube 41 and the straight tube 42 in the length corresponding to the layout of the vehicle are used, and the bending tube 41 and the straight tube 42 are attached to the outer periphery of the electric wires W.

Then, the protector 2 is attached to the bending tube 41 and the straight tube 42. The protector 2 is disposed at a position set in advance to cover the outer periphery of the bending tube 41 and the straight tube 42 with the first lid 221 and the second lid 222 being opened with respect to the main body part 21. For example, the protector 2 is installed such that the first lid 221 is positioned on the outer periphery of the straight tube 42 and the second lid 222 is positioned on the outer periphery of the bending tube 41. Then, in the protector 2, the first lid 221 and the second lid 222 are closed. At this time, the main body part 21 of the protector 2 has the biting parts 27 formed therein, and the biting parts 27 enter the concave parts 41B of the bending tube 41. This restricts the movement of the protector 2 in the axial direction X with respect to the bending tube 41.

Furthermore, the binding member 5 is attached to the binding part 28 of the protector 2. In other words, the binding member 5 is disposed along the binding part 28 to be wrapped around the straight tube 42 and the protector 2. This prevents the protector 2 from moving with respect to the straight tube 42. Furthermore, the straight tube 42 is inserted into the protector 2 to the inner side of the mounting position of the clamp 3. Thus, the straight tube 42 is held firmly by the protector 2. Therefore, it is possible to suppress deflection of the straight tube 42 after routing.

Then, the clamp 3 is attached to the protector 2. The clamp 3 is disposed between the movement restriction parts 26 and 26 of the protector 2 by opening the lid part 312 with respect to the main body part 311. Then, by closing the lid part 312, the clamp 3 is attached to the outer periphery between the movement restriction parts 26 and 26 that is allowed to make a sliding movement and a rotational movement.

Then, as illustrated in FIG. 8, the electric wire fixing device 1 is attached to the bending tube 41 and the straight tube 42. At this time, in the wire harness WH, a plurality of the electric wire fixing devices 1 may be used in accordance with the layout of the vehicle. Furthermore, in the wire harness WH, a plurality of the bending tubes 41 and straight tubes 42 may be used in accordance with the layout of the vehicle. As described, the positions and orientations of the bending tubes 41 and the straight tubes 42 vary and the shapes of the bending tubes 41 vary as well depending on the layout of the vehicle. In regards to this, the electric wire fixing device 1 is used by being attached to the outer periphery of the bending tube 41 and the straight tube 42, thereby making it possible to correspond to the layout of various vehicles. In other words, it is possible to fix the electric wires W by attaching the electric wire fixing devices 1 to the bending tubes 41 and the straight tubes 42 provided in accordance with the layout of the vehicle and allowing the clamp 3 to make a sliding movement and a rotational movement with respect to the protector 2. Therefore, the electric wire fixing device 1 and the wire harness WH are highly versatile.

Then, in FIG. 1, the electric wires W are routed and secured to the vehicle. In other words, the bending tube 41, the straight tube 42, and the electric wire fixing device 1 are disposed along the route where the electric wires W are to be routed for the vehicle, and the electric wire fixing device 1 is fixed to the body or the like of the vehicle by the clamp 3. By the fixation of the electric wire fixing device 1, the electric wires W are fixed to the vehicle. The clamp 3 is fixed, for example, by inserting a stud bolt (not illustrated) provided in the vehicle into the hole 32A of the clamp 3. At this time, the clamp 3 can make a sliding movement along the axial direction X with respect to the protector 2 and can make a rotational movement in the circumferential direction with respect to the protector 2. In other words, the clamp 3 can make a sliding movement along the axial direction X and a rotational movement in the circumferential direction with respect to the bending tube 41 and the straight tube 42. Therefore, the clamp 3 can be easily aligned with the stud bolt protruding from the vehicle by making the sliding movement. Furthermore, the clamp 3 can be adjusted in the posture or orientation with respect to the stud bolt protruding from the vehicle by making the rotational movement. Therefore, the electric wire fixing device 1 and the wire harness WH can absorb dimensional errors of the bending tube 41 and the straight tube 42, or misalignment of the disposed positions of the bending tube 41 and the straight tube 42. In other words, with the electric wire fixing device 1 and the wire harnesses WH, it is possible to fix the clamp 3 easily and smoothly perform routing work and fixing work of the electric wires W.

As described above, in the electric wire fixing device 1 and the wire harness WH according to the present embodiment, the clamp 3 is attached to the protector 2 that is attached in a manner of being allowed to make a sliding movement and a rotational movement with respect to the bending tube 41 and the straight tube 42 that house the electric wires W, and thus the clamp 3 can be fixed to the vehicle easily, and routing work of the electric wires W can be performed smoothly.

Furthermore, in the electric wire fixing device 1 and the wire harness WH according to the present embodiment, the protector 2 can be attached to the bending tube 41 and the straight tube 42 that house the electric wires W. This makes it possible to fix the electric wires W using the electric wire fixing device 1 even for the layout of different vehicles. Therefore, the electric wire fixing device 1 is highly versatile in fixing the electric wires W.

Furthermore, in the electric wire fixing device 1 and the wire harness WH according to the present embodiment, the protector 2 has the main body part 21 and the lid part 22 that are divided in the circumferential direction, and the lid part 22 is axially supported to the main body part 21 by the hinge to be openable and closeable. Therefore, the lid part 22 comes to be the same component with the main body part 21 in the electric wire fixing device 1, so that the number of components can be reduced. In addition, the electric wires W can be attached easily with the electric wire fixing device 1 and the wire harness WH, thereby improving the workability of assembling the electric wires W.

Furthermore, since the hinge for rotating the lid part 22 is provided outside the moving range of the clamp 3, the electric wire fixing device 1 and the wire harness WH according to the present embodiment can allow the outer peripheral face 2A of the protector 2 to be in a smooth circumferential face at the mounting position of the clamp 3, which can smoothen the rotational movement of the clamp 3.

Moreover, in the electric wire fixing device 1 and the wire harness WH according to the present embodiment, the bending tube 41 that is bendable and the straight tube 42 that has higher rigidity than the bending tube are used as the cylindrical members configured to house the electric wires W, the protector 2 is attached to the outer periphery of the bending tube 41 and the straight tube 42, and the straight tube 42 is inserted into the inner side of the clamp 3 and held in the protector 2. Therefore, the electric wire fixing device 1 can hold the straight tube 42 by the protector 2, and suppress the deflection of the straight tube 42.

Next, an electric wire fixing device and a wire harnesses according to a second embodiment will be described.

As illustrated in FIG. 9, an electric wire fixing device 1A according to the second embodiment has almost the same configuration as that of the electric wire fixing device 1 according to the first embodiment described above, and it differs from the electric wire fixing device 1 according to the first embodiment described above in respect that the main body part 21 of the protector 2 has an extension part 211 formed along the shape of the bending tube 41. Furthermore, the electric wire fixing device 1A according to the second embodiment differs from the electric wire fixing device 1 according to the first embodiment having the first lid 221 and the second lid 222 in respect that it has a third lid 223, a fourth lid 224, and a fifth lid 225 in addition to the first lid 221 and the second lid 222. Moreover, the electric wire fixing device 1A according to the second embodiment differs from the electric wire fixing device 1 according to the first embodiment having the single clamp 3 in respect that it has two clamps 3. The wire harness WH according to the second embodiment is configured including the electric wires W and the electric wire fixing device 1A.

The main body part 21 of the protector 2 has the extension part 211 formed therein. The extension part 211 is a part configured to support the bending tube 41, and is formed along the routing path of the electric wires W. The extension part 211 is arc-shaped in the cross section that intersects with the extending direction of the electric wires W, and is provided to cover the lower part of the bending tube 41. Thus, the bending tube 41 is disposed along the shape of the extension part 211.

In the extension part 211, the third lid 223, the fourth lid 224, and the fifth lid 225 are provided. The third lid 223, the fourth lid 224, and the fifth lid 225 prevents the bending tube 41 housed in the extension part 211 from floating while being installed and prevents the bending tube 41 from moving up and down in the extension part 211. Furthermore, the third lid 223, the fourth lid 224, and the fifth lid 225 are formed to be rotatable and lockable by the same mechanism as that of the first lid 221 or the second lid 222. Like the first lid 221, the fifth lid 225 may have the movement restriction parts 26 formed therein and allow the clamp 3 to make a sliding movement and a rotational movement. Furthermore, the biting parts 27 may be formed in the extension part 211 where the third lid 223 and the fourth lid 224 are provided. In this case, at the positions where the third lid 223 and the fourth lids 224 are provided, movement of the protector 2 in the axial direction X with respect to the bending tube 41 can be restricted.

Such electric wire fixing device 1A and wire harness WH according to the second embodiment can acquire the same effects as those of the electric wire fixing device 1 and the wire harness WH according to the first embodiment described above. For example, in the electric wire fixing device 1A and the wire harness WH according to the present embodiment, the clamp 3 is attached in a manner of being allowed to make a sliding movement and a rotational movement with respect to the protector 2 that is attached to the bending tube 41 and the straight tube 42 that house the electric wires W, and thus the clamp 3 can be fixed to the vehicle easily, and routing work of the electric wires W can be performed smoothly. Furthermore, the electric wire fixing device 1A and the wire harness WH according to the present embodiment can reduce the number of components by axially supporting the lid part 22 to the main body part 21 by the hinge to be openable and closeable and by making the lid part 22 the same component with the main body part 21. In addition, the electric wires W can be attached easily with the electric wire fixing device 1A, thereby improving the workability of assembling the electric wires W. Furthermore, since the hinge for rotating the lid part 22 is provided outside the moving range of the clamp 3, the electric wire fixing device 1A and the wire harness WH according to the present embodiment can allow the outer peripheral face 2A of the protector 2 to be in a smooth circumferential face, which can smoothen the rotational movement of the clamp 3. Furthermore, the electric wire fixing device 1A and the wire harness WH according to the present embodiment can suppress the deflection of the straight tube 42 when the straight tube 42 is inserted into the inner side of the clamp 3 and held in the protector 2.

Moreover, in addition to the same effects as those of the electric wire fixing device 1 and the wire harness WH according to the first embodiment described above, the electric wire fixing device 1A and the wire harness WH according to the second embodiment can hold the bending tube 41 disposed by being bent or curved by the extension part 211 of the main body part 21.

The electric wire fixing device 1A according to the second embodiment can also be used in combination with the electric wire fixing device 1 according to the first embodiment. For example, as illustrated in FIG. 10, the electric wire fixing device 1A and the electric wire fixing device 1 are installed by sandwiching the straight tube 42. In other words, the electric wire fixing device 1A is installed to support one end of the straight tube 42, and the electric wire fixing device 1 is installed to support the other end of the straight tube 42. Thereby, the straight tube 42 is firmly supported by the electric wire fixing device 1A and the electric wire fixing device 1, and routed without deflection. Furthermore, the bending tube 41 is held by the extension part 211 of the electric wire fixing device 1A and routed appropriately along the routing path. The electric wire fixing device 1A and the electric wire fixing device 1 can be smoothly fixed to the vehicle since the clamps 3 is allowed to make a sliding movement and a rotational movement with respect to the protector 2. Therefore, the electric wires W can be smoothly fixed and routed by the electric wire fixing device 1A and the electric wire fixing device 1.

Note that the electric wire fixing device and the wire harnesses according to the present invention are not limited to the embodiments described above, and various changes are possible within the scope of the appended claims. The electric wire fixing devices 1, 1A and the wire harness WH may be configured by combining the structural components of each of the embodiments and the modification example described above as appropriate.

For example, while the electric wire fixing devices 1, 1A and the wire harness WH according to the embodiments are described by referring to the cases of being loaded on a vehicle, those may also be used without being installed in a vehicle.

Furthermore, while the electric wire fixing devices 1 and 1A according to the embodiments are described by referring to the case where the outer peripheral face 2A of the protector 2 is formed to have a circular cross section and the inner peripheral face 31A of the annular part 31 of the clamp 3 is formed to have a circular cross section, one of the outer peripheral face 2A of the protector 2 and the inner peripheral face 31A of the annular part 31 of the clamp 3 may be formed to have a circular cross section, and the other may be formed to have a cross section in a shape other than a circular shape. For example, one of the outer peripheral face 2A of the protector 2 and the inner peripheral face 31A of the annular part 31 of the clamp 3 may be formed to have a circular cross section, and the other may be formed to have a polygonal cross section. Even with such an electric wire fixing device, it is possible to allow the clamp 3 to make a sliding movement and a rotational movement with respect to the protector 2.

Furthermore, while the electric wire fixing devices 1 and 1A according to the embodiments described above are configured by attaching the protector 2 to the outer periphery of the bending tube 41 and the straight tube 42 and attaching the clamp 3 to the outer periphery of the protector 2, the clamp 3 may be directly attached to the outer periphery of the cylindrical member that is the bending tube 41 or the straight tube 42. For example, the clamp 3 may be attached to the outer periphery of the cylindrical member and allowed to make a sliding movement and a rotational movement with respect to the cylindrical member, and two protectors 2, which are separated from each other from both end parts of the clamp 3 and functions as the movement restriction parts, may be attached to the outer periphery of the cylindrical member. Even with such an electric wire fixing device, the same effects as those of the electric wire fixing device 1 described above can be acquired. In other words, with the electric wire fixing device, it is possible to fix the clamp 3 easily to a vehicle and smoothly perform routing work of the electric wires W.

With the electric wire fixing device and the wire harnesses according to the present embodiments, electric wire routing work can be performed smoothly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire fixing device comprising:
   an electric wire protection member attached to an outer periphery of a cylindrical member configured to house an electric wire; and
   a fixing member configured to be fixed to a vehicle, the fixing member being attached to the electric wire protection member in a manner of being allowed to make a sliding movement in an extending direction of the electric wire and make a rotational movement about the extending direction, wherein
   the electric wire protection member includes a movement restriction part configured to restrict a moving area of the sliding movement of the fixing member.

2. The electric wire fixing device according to claim 1, wherein
   the electric wire protection member is formed in a cylindrical shape, and includes a main body part and a lid part that are divided in a circumferential direction, and
   the lid part is axially supported to the main body part by a hinge to be openable and closeable.

3. The electric wire fixing device according to claim 2, wherein
   the hinge is provided outside the moving area of the fixing member.

4. The electric wire fixing device according to claim 1, wherein
   as the cylindrical member, a bendable bending tube and a straight tube that has higher rigidity than the bending tube are alternately disposed along the extending direction, and
   the electric wire protection member covers an outer periphery of the bending tube and the straight tube by being attached at a boundary position between the bending tube and the straight tube, and the electric wire protection member holds the straight tube by being inserted into an inner side of a mounting position of the fixing member.

5. A wire harness comprising:
   an electric wire exhibiting conductivity; and
   an electric wire fixing device configured to fix the electric wire to a vehicle, wherein
   the electric wire fixing device includes:
      an electric wire protection member attached to an outer periphery of a cylindrical member configured to house the electric wire; and
      a fixing member configured to be fixed to a vehicle, the fixing member being attached to the electric wire protection member in a manner of being allowed to make a sliding movement in an extending direction of the electric wire and make a rotational movement about the extending direction, and
   the electric wire protection member includes a movement restriction part configured to restrict a moving area of the sliding movement of the fixing member.

* * * * *